Patented July 18, 1944

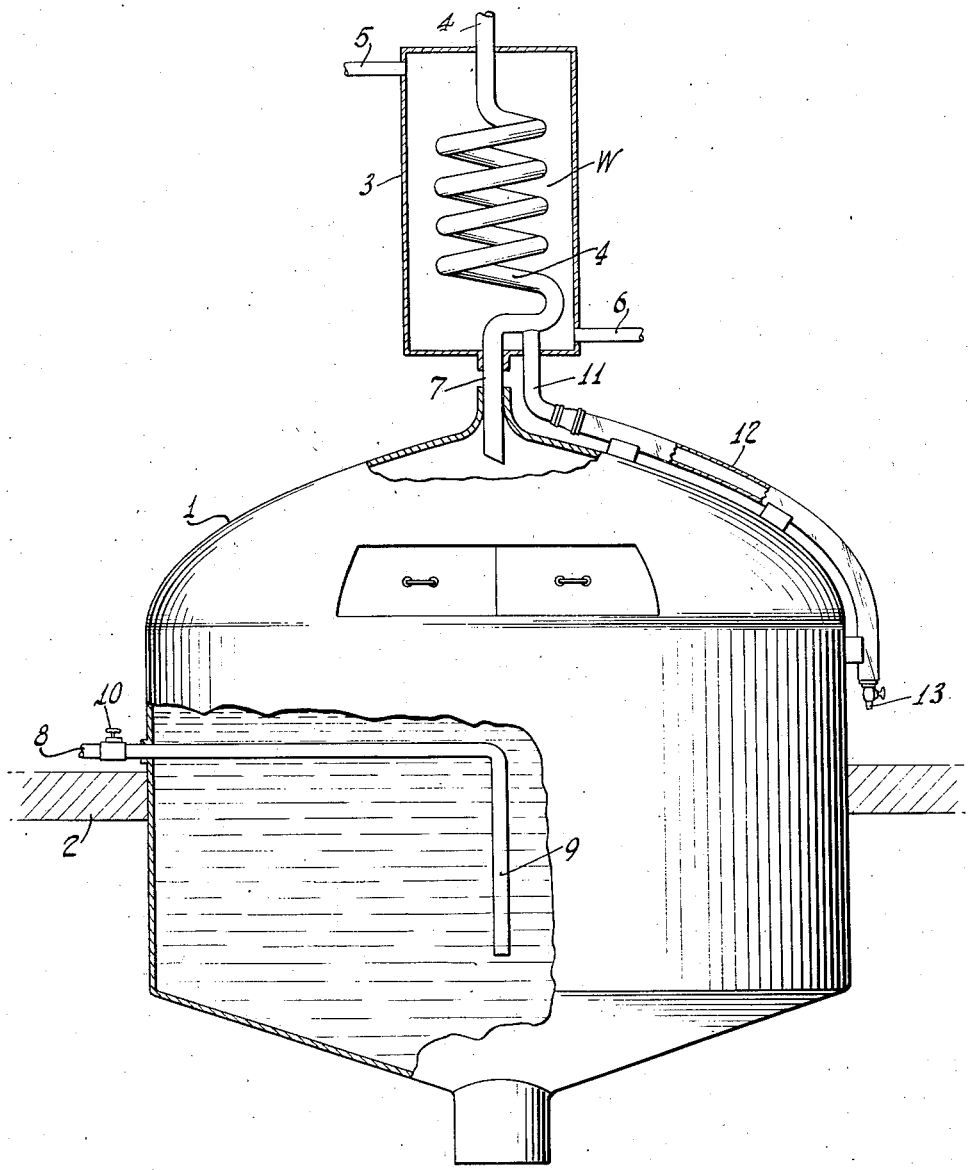

2,354,092

UNITED STATES PATENT OFFICE 2,354,092

ART OF BREWING BEER, ALE, OR NEAR-BEER

Berthold Stein, Brooklyn, N. Y.

Application December 11, 1940, Serial No. 369,574

7 Claims. (Cl. 99—52)

The present invention relates to certain improvements in the art of brewing beer, ale, near beer, or the like, with the principal object of making a more palatable and stable malt liquor, because a decided need exists for such improvement, inasmuch as a great many people do not like to drink the present malt liquor of such general class particularly because of the taste unpalatable or odor.

The particular apparatus preferably employed in my process is described and claimed in my application Serial No. 447,965, filed June 22, 1942, which is a division of my instant application.

The present invention includes both the process of brewing as hereinafter described, and the beverage or resulting product thereof, and when referring to beer it is intended to include ale and near-beer, and analogous beverages of the same class.

Beer as well as ale is generally described as a fermented malt liquor with an average percentage of alcohol of from three to four per cent. by weight, or sometimes less, as in near beer, which may have about one-half per cent. It has a mildly bitter and aromatic flavor and odor. The brewers have always attempted to give the beer an aromatic hop flavor and odor. Up to date, they have not succeeded in doing so. The bitter and so-called aromatic flavor is to be derived from the hops which are used in the brewing process. While all kinds of beer and ales taste more or less bitter, there are no beers brewed which really have an aromatic hop flavor and odor. This is due to the processes and apparatuses which are employed in the brewing of beer and ale. All beers and ales have a more or less pronounced bitter taste, and they often have a disagreeable taste and odor as well. The latter is derived principally from the cellulose matter of the husks of the grain, and the fatty oils contained in the grain, such as barley, corn or rice. These bitter tastes and disagreeable odors are the principal reasons why so many people do not drink beer. It is generally understood that beer and ale is made from malt and hops. In this country, however, beer and ale is brewed mostly from a mixture of barley malt (about 70%), and cereals unmalted (about 30%), namely, corn, rice, corn syrups or sugars, and hops. The hops in the brewing of beer and ales are used as a spice or condiment with a view to overcoming the above-mentioned bad taste and odor.

The brewing process starts in the mash tun, but I will not describe the process of mashing in the mash tun, as my invention has nothing to do with that part of the brewing process. My invention deals only with the processes which take place in the brew-kettle. After the mashing process in the mash tun has been completed, the liquid, which from now on is called the "wort," is run into the brew-kettle, generally called the "copper." The purposes of the treatment in the brew-kettle are as follows:

First, to bring the wort to a boil in order to sterilize the wort; second, to coagulate the albumenous matter of the wort which is derived from the malt and other cereals used for the brew in the mash tun; and third, to extract the desirable active principles from the hops and bring them into solution or into a thorough mixture.

As above described, this prevailing treatment always takes place in an open brew-kettle, thus permitting the steam generated by the boiling of the liquid, which generally contains about 90% of water, to escape. These steam vapors carry with them volatile substances of the liquid. The amount of hops used varies from one to three pounds and more per barrel. In my process, I need only from one-tenth to one-fifth the amount of hops, as compared to the above-mentioned amount.

Most of the brewers add one-quarter of the whole amount of hops to be used in a brew when the bottom of the kettle is covered with wort. The balance of the whole amount is added when the kettle is half filled with wort. Some brewers, however, add the whole amount of hops to be used for one brew when the kettle is half filled with wort. Some add the hops in two or three portions at different times, for instance, brewers add 30% of the hops to be used for the brew when the bottom of the kettle is covered with wort, 30% of the hops when the kettle is half filled, and the balance of 40% of hops is added about fifteen minutes before the boiling process is finished. This latter step is very wasteful because the hops cannot be extracted sufficiently in such a short time. The purpose of this latter step is to reduce the loss of volatile substances from the hops. The whole boiling process in the kettle takes from two and one half to three hours.

In order better to understand my invention, to be explained later herein, I will give a description of the active and desirable principles of hops. Only the female of the hop plant is cultivated for brewing purposes, and it furnishes the strobiles which are used in brewing. They consist of numerous thin, translucent, veined, leaf-like scales.

The most active principle of hops is contained in a substance formed on the scales, existing in the state of very small granules. This substance is called "lupulin." This "lupulin" represents about $\frac{1}{10}$th to $\frac{1}{8}$th of the weight of the hops. It seems to be of a glandular nature, originating in the epidermal cells of the leaf-like scales of the strobiles. When fully developed, they secrete a resinous matter. In technical brewing literature, these resinous substances are not defined in their chemical structure, but are given only as hard and soft resins. The odor and aroma of hops resides in an essential oil which is embedded in the resinous matter. The leaf-like scales, which are of a pale, greenish yellow color consisting of cellulose carry only very small quantities of the aromatic odor and flavor of hops. This essential oil consists of terpenes, one ($C_{10}H_{16}$), and the other ($C_{10}H_{18}$) boiling at 125 C.–130 C. The latter makes up almost two-thirds of the oil. The amount of hop oil contained in hops varies from 0.13 to 0.27%. The hop oil is very volatile. If hop oil in a mixture of water, or as in the brewing process in a mixture of malto-dextrine in water as in beer wort, is boiled for 30 minutes, 80% of the hop oil is volatilized with the steam. When boiled for another fifteen minutes, all the hop oil has escaped from the wort. A very small part of the oil may be occasionally oxidized by longer boiling to a resinous matter of bitter taste, which has lost the characteristic of the pleasant and agreeable odor and flavor of hops. Other substances contained in hops are two kinds of tannic acid, and a bitter acid $C_{32}H_{50}O_7$, and these substances are derived principally from the resinous matter of the hops. The extraction of these resins, as well as the extraction of the essential oil, from the hops is a comparatively slow process. This is complicated by (1), the colloidal character of the resins and (2), the limited solubility in water or a watery malto-dextrine solution of wort.

After the resinous matter has been extracted by boiling in the wort, and all valuable substances have been embedded in the wort, the former are no longer of any importance. They are removed during the boiling with the coagulum of the albumenous matter and removed with the yeast during and after fermentation. The chemical constitution of the resinous matter is unknown. This resinous matter is also found on the sides of the fermenting vessels, it having been thrown out during fermentation. No hop resins were ever found in finished beers or ales. It would be impractical to boil beer wort under pressure in order to accelerate a more rapid extraction of resins and essential oils because of their tendency to decompose under pressure. The changes which the hop resins undergo, if any, during the boiling of the hops in wort is completely unknown and rather basic. A great amount of resinous matter is removed during the boiling by adsorption with the coagulum of albumenoids in the wort. Some are removed when the wort is being cooled before they run into the fermenting vessel. Another large percentage is lost during fermentation.

Beer wort, when it goes from the mesh tun into the brew-kettle, has (1), an unpleasant taste and odor, derived from, and varied by, the materials used; (2) this unpleasant odor and flavor come largely from the husks of the malt or other cereals used in the mashing process; and (3), the fatty oils obtained from barley, rice and corn get into the beer wort, causing the development of an unpleasant taste and odor in the beer and ale to be brewed. The husk of barley represents about 8% of the malt, and contains substances which have a rank and disagreeable flavor and odor. During the mashing process, a great many of these substances are brought into the solution by enzymatic action. All these substances are run into the brew-kettle. In order to completely exhaust the contents of the malt and cereals used in the mash tun they are frequently sparged with warm water in order to get as many substances in the wort into solution or dispersion as possible. Wort contains the following substances: malto-dextrines, sugars, albumenoids, fatty oils, tannic acid, lactic acid, nitrogenous matter such as amides, and other organic substances. Thus they are in the usual finished beer in various quantities.

The purpose of my process is to remove undesirable substances which give beer and ale that rank and disagreeable flavor and odor. This task can be accomplished if in the kettle the wort is treated in two special stages according to my process.

The first stage in my process is that the wort is boiled without any hops at a temperature of 100° C. for about half an hour in an open brew-kettle. A sample is taken out and tested for odor and flavor. Generally, one-half hour of boiling is sufficient to remove the undesirable substances from the wort which are causing the rank and disagreeable odor and flavor. Should they not have been removed after one half hour of boiling, the boiling has to be continued until they all have been removed by evaporation. The result is a pure, clean tasting wort having a clean pure flavor of sugars and malto-dextrines.

The prevailing processes of brewing boil the wort together with the hops without removing any of those substances which are contained in every beer wort, which give the wort a rank and disagreeable odor and flavor, before the hops are added. In such processes there are to be observed two phases: (1), by boiling the wort and hops together in an open kettle all the volatile aromatic active principles of the hops are driven out with steam developed during boiling; and (2), a large part of the fatty oils derived from the brewing materials during the mashing process, and which are dispersed in the wort when boiled together with the hops, adhere to the bulk of the hops. During the boiling process the hops are distributed all over in the liquid and are always in contact with the fatty oils and other substances dispersed in the wort.

Fatty oils, not being as volatile as essential oils, are adsorbed by the leaf-like scales of the hops. After the boiling of the wort is finished, it is separated from the hops by the process of filtration in the hop back or hop strainer. These hop strainers generally consist of a cylindrical or rectangular iron or copper vessel, fitted with a false bottom. The construction of the hop strainer is such that the bulk of the hops becomes a filter bed. In an average brew-house outfit the hop strainer is so constructed that the bed of hops formed is not less than 18–20 inches thick. These hops have adsorbed a great part of those fatty oils and derivatives from the husk of the malt and grains, as before described. The hot wort running over the hops washes out the fatty oils and other substances, which it had adsorbed during the process of boiling, and carries these substances into the fermenting vessel. They are dispersed in the wort, and from now on they remain during the subsequent processes of brewing, such as fermentation and finishing.

These substances give the beer a rank and disagreeable flavor and odor. One of the reasons for the formation of these badly-tasting and badly-smelling substances is that the fatty oils gradually split off fatty acids, causing bad flavors, known as rancidity. Furthermore, these fatty acids form during fermentation, in statu nascendi, with the radicals of the produced ethyl alcohol, esters of bad taste and odor. This formation is further increased during storage of the ale and beer and gets worse the older the beer or ale becomes.

Having in mind the fact that brewers have not as yet been able to make the proper use of the highly fragrant and aromatic spice of hops because the process is along the lines of what I have just described, I have the following objects and advantages in view: first, to remove the substances causing bad odors and flavors in beer, ale or the like, or to inhibit or prevent their development; second, to retain in the wort and in the beer or the like the essential oil of hops, which oil is the only characteristic carrier of hop flavor and aroma; third, to emulsify the essential oil in the wort so that it stays in the finished beer, ale or the like, giving the latter the desired fine hop aroma and flavor; fourth, to establish a saving in the amount of hops required for use, which under my invention may be from 50–90%; fifth, to reduce the amount of tannic acid and tannin compounds, as, through the small amount of hops used in my process, the contents of such acid and compounds in beer or the like are reduced to a minimum, and to overcome their tendency to cause turbidity and haze in beer, ale or the like. Accomplishment of this object is desired because tannic acid and tannin compounds, such as tannin peptones, have a bitter and astringent taste and impart to beer, ale or the like a harshly and sharply bitter taste.

In order that my invention may be more fully understood, I will refer to the accompanying figure of drawing which illustrates a brew-kettle provided with such apparatus parts as are desirable to enable the new process to be carried out.

In the drawing, the brew-kettle 1 has the customary dome and extends partly above and partly below the floor level 2, as is customary in a brewery. On the dome of the kettle 1 there is mounted a reflux condenser, which comprises an outer casing 3 and a condensing-coil 4 or the like in the casing 3, so that a water-jacket space W is provided between the condensing-coil 4 and the casing 3. It is obvious that the condensing-coil 4 may be in the form of a tube extending through the casing and enlarged at intervals by bulb-like formations.

The water-jacket W permits the flow of cold water therethrough, which is admitted at an inlet-pipe 6 and which flows out at outlet-pipe 5. The reflux condenser is rigidly mounted upon the brew-kettle 1 or rigidly mounted in some such way as to have a fixed position relatively to the brew-kettle, and which latter has an air-tight connection with the lower downward portion 7 of the condensing-coil or unit. The kettle can either be heated by direct fire or superheated steam through a steam jacket of the kettle, or by a heating coil inside of the kettle, all of which is known in brewery practice.

For the purpose of admitting oxidizing air into the kettle, a supply-pipe 8 leads through the side wall of the kettle, preferably adjacent the floor level, and its inner discharge end 9 preferably leads to near the central lower portion of the interior of the kettle. Such supply-pipe 8 is provided with a control-valve 10. At the lowest point of the condensing-tube or coil 4 and near the bottom of the water-jacket W, a tube 11 is connected which passes through the bottom of the water-jacket. This tube 11 preferably has a long section 12 of transparent glass, which is supported on the brew-kettle or in some other desirable manner, and the lower end of which extends to a point above the floor 2, which can be easily reached by the brewer, at which point the tube 11—12 is provided with a suitable faucet or tap 13. The purpose of the tube 11—12 will be stated subsequently herein.

In carrying out my process, the reflux condenser is not used as such in the beginning of the brewing operation, that is to say, no cooling water is caused to flow through the water-jacket W of the condenser. The wort having been admitted into the brew-kettle from the mash tun, and the boiling point of approximately 100° C. reached, the inner tube 4 of the condenser serves as an exhaust pipe for the steam and vapors formed by the boiling wort. During this first step of the process, only the unhopped wort is in the brew-kettle, and no hops have been introduced thereinto. The boiling of the wort is continued until all the undesirable substances have been removed therefrom by the boiling of the wort. Some of these undesirable substances which are not directly volatile are removed by and with the steam escaping from the pipe or tube 4. Such pipe or tube 4 then corresponds to the steam outlet pipe which usually extends up from the ordinary brew-kettle, so that the steam is carried off in the outer atmosphere.

During the boiling of the wort without the addition of hops a certain amount of albumenoids have been coagulated during the boiling. When this boiling of the wort has been continued for the required length of time, cold water is admitted into the water-jacket W of the condenser, which as such closes the kettle against the escape of volatile substances, and from this point on the reflux condenser will act as such.

After all of the undesirable substances, such as fatty oils, have been eliminated by boiling, a stream of air containing ozone is admitted and injected into the boiling wort, through air-inlet-pipe 8 and the discharge-end 9, by opening the valve 10. It takes but a few minutes of treating the wort in this way until all undesirable albumenoids, which heretofore had not been coagulated by boiling, are now coagulated and a very flocculent break is obtained by this process of oxidation.

In the old process a so-called break in the kettle during boiling of wort with the hops had been always considered as a very important step at the boiling stage of the wort in brewing. Great importance had been given to the influence of the tannic acids extracted from the hops to the coagulation of albumenoids during boiling. Some of the albumenous matter, especially proteins, unite with tannic acid to produce the so-called peptone-tannins. There are only partly removed during fermentation and cooling and do not leave the beer, and produce a definite instability, causing haze and turbidity in the finished beer. Only a certain amount of albumenous matter in the wort can be coagulated by boiling. Processes of aeration have been applied before in the boiling of wort, but without the intended results. The reason why negative results were obtained by treating boiling wort with air or ozone mixed air was that these operations were performed in an open kettle. The desired reaction of the oxygen from the injected air and ozone mixture on the albumenous matter in wort does not take place with sufficient strength in an open brew-kettle, as this air mixture is driven out from the boiling wort as rapidly as it is injected and escapes unused together with the escaping steam.

If, however, the action of air and ozone takes place in a kettle which is closed by a reflux condenser as in my process, nothing escapes and a complete reaction with the oxygen takes place in a short time. All vapors are condensed in the condenser and returned to the kettle. A striking and visible change takes place by this process. Through my oxidation process, which takes place before the hops are added, all undesirable albumenoids which have not been coagulated by boiling are coagulated and are easily removed when run through the hop strainer. Those undesirable coagulated albumenoids not removed in the hop strainer will be removed during fermentation or by filtration of the finished beer or ale. However, during the injection of the stream of air or ozone into the wort which is boiling in the brew kettle, that is closed by the reflux condenser, certain amounts of the albumenous matter are converted into such albumenous bodies as will not be coagulated by boiling, or react against tannates, and they stay also in solution in finished beer if the latter is exposed for several days to a chilling temperature near the freezing point. This explains what takes place in order to obtain stabilization of the finished beer as stressed later on in the present description.

I will not commit myself to the chemical reactions which take place with the different albumenoids during the injection of the ozone-air mixture, as the constitution of the molecules of albumenoids is not yet definitely known. The great number of albumenoids in wort are of different natures, generally known as albumen, albumose, albumin, globulin, proteins, peptones, protoses, polypeptides, free amino acids and some others. Very few of these nitrogenous substances have been separated from wort in a form in which they can be definitely identified. A small sample taken out in a glass from the kettle will show plainly the formation of a heavy coagulum. The same will easily settle and is easily removed when the wort is run from the kettle into the hop back or strainer. The advantage of this procedure is striking. Beer and ales brewed according to this new process derive a greater resistance against chilling, which is particularly noticeable in bottled beer. Beer or ale brewed according to my process in the kettle will stay clear if exposed for several days to a temperature close to freezing (about 1 plus C.). At present there are proteolytic enzymes like pepsin or papain used to prevent cloudiness in bottled beer when exposed to low temperatures. These proteolytic enzymes are added to the beer or ale after fermentation, and great sums are spent each year to make beer chill-proof by so doing. This shows that in practice conventional beer and the like containing substances derived from hops are not chill-proof unless specially treated after the finishing thereof. This process will become superfluous, if my process is applied in treating the wort in the kettle.

Besides the former practice above mentioned, beer is stored below freezing temperature for several days, after its completion and fermentation in order to coagulate certain albumenoids by freezing, and thereafter they are removed by filtration, but even this procedure does not always accomplish the desired object.

When in my process all of the undesirable substances have been removed from the wort by the boiling thereof, and after other undesirable substances of albumenoids or nitrogenous character have been coagulated by oxidation through the air-ozone mixture injected into the wort, the temperature of the wort is lowered below the boiling point for a few minutes. This is easily accomplished by shutting off the steam valve for a few minutes or by opening the door of the stove if the wort is boiled over a direct fire.

The purpose of lowering the temperature of the wort is to prevent the hops from being blown out of the kettle when they are added, for the latter would occur inasmuch as the steam pressure in the kettle is higher, since the reflux condenser has been caused to function. The door 14 at the top of the brew-kettle is now opened and all of the hops to be used for the brew are placed in the kettle in one charge, and as before stated, the charge of hops is in a comparatively small amount in contrast with the large amount of hops which are used in the present brewing practice. After the kettle has been closed, the boiling of the wort is continued for from about 45 minutes to one hour. During this process all the bitter aromatic substances, tannins and essential hop oils are extracted from the hops. If the boiling of the hops takes place in an open brew-kettle which allows the free escape of vapors, all aromatic volatile substances, and especially the volatile essential oil of the hops, would be driven out. By boiling in a kettle closed by a reflux condenser, the essential oil, when evaporating from the boiling wort, goes into the condenser, where it is condensed and drips back into the boiling wort.

However, at the beginning of the process of boiling the wort after the hops have been added, the separating tube 11, 12 does its work. This is to separate the first part of the steam and vapors which emanate from the brew-kettle. The size of this tube 11, 12 is of sufficient capacity to hold the usual amount of the so separated, condensed, emanated liquid which it is expected will develop at the beginning of this phase of the process; that is to say, that liquid which contains those undesirable substances which have evaporated from the kettle in the beginning of the boiling on account of their having a boiling point lower than the boiling points of the essential oils in the hops.

As before stated, the tube 11, 12 is provided with a faucet 13, which is under the control of the brewer so that he may take out a sample of the liquid which first comes off with the steam and vapors when the reflux condenser is operating. Preferably, the section 12 of said tube is transparent so that the brewer may observe the condition of the emanated liquid referred to and note whether it is cloudy or hazy. In the beginning of the operation, this emanated liquid which collects in the tube 11, 12 will have a bad odor and flavor, which is derived from the cellulose parts of the leaves of the hops. As long as this liquid has this bad odor and flavor the faucet 13 is opened to remove it, but as soon as it begins to show a clean taste and odor it is no longer removed.

The essential oil of hops is hardly soluble in water, as only minute quantities would stay in solution and are not sufficient to impart to the liquid a pronounced hop flavor or aroma.

As before stated, the action of the reflux condenser is such as to condense the essential oil which is evaporating from the boiling wort and hops, while at the same time the oil drips back into the kettle. The oil going back into the wort is gradually emulsified by the dextrines present in the wort, which are of a gum-like character. This emulsification could not be accomplished if the boiling of the wort with hops were performed in an open brew-kettle, where the oil is evaporated, as is done in present brewing processes. If emulsified according to the present invention, the emulsion is complete and stable, and a greater amount of the oil is brought into the wort. The emulsified essential oil will stay emulsified during the entire process of brewing which follows thereafter.

I have found that the dispersion of the hop oil in the emulsion is so fine that if the liquid containing it is filtered it will pass unchanged through a paper filter, while even the smallest microorganism in the same liquid will be retained by the filter.

It is my observation that very few beer and ale drinkers are cognizant of the true hop taste and odor, but in the hop store-room of a brewery the pleasant aroma of hops is very noticeable. Unfortunately, however, the brewers following the present processes have not as yet been able to make the proper use of the highly fragrant and aromatic spice of hops, and this is due to the unscientific brew processes and working methods which are followed.

It will be obvious to those skilled in the art of brewing that the present invention is not restricted in scope except in accordance with the appended claims.

What I claim is:

1. The process of brewing which comprises, in a first brew-kettle stage, heating the wort to boil at substantially atmospheric pressure while venting the vaporized constituents thereof, thereby to bring the wort to the desired concentration while eliminating its undesirable vaporizable constituents; and in a second kettle stage introducing hops and heating the brew to boil at atmospheric pressure, while conserving the vaporized constituents thereof by cooling and condensing the vapors, and flowing at least the main part of the resulting condensate back into the boiling brew, including the desirable hop oil content thereof.

2. The brewing process of claim 24, wherein in the first stage the boiling partly coagulates the albumenoids of the wort; and in the final period of said stage before adding hops and while effectively sealing the brew by condensing and returning the vapors thereto, causing the oxidation of further albumenoids in the boiling wort, by injecting into the unhopped wort an oxidizing gas of the class consisting of oxidizing air and air containing ozone, thereby to coagulate and precipitate such albumenoids.

3. The brewing process of claim 1, wherein in the second stage the hops are added in a single charge and in a restricted proportion determined by the quantity of hops needed to supply the amount of hop oil and accompanying aromatics for giving the brew a desired flavor and aroma.

4. The brewing process of claim 1, wherein in the second stage the operations of boiling, vaporizing, condensing and reflowing condensate to the brew are continued until the returned essential hop oil gradually becomes substantially completely emulsified in the brew by the dextrine of the wort and thereby stabilized in fine dispersion therein.

5. The process of brewing which comprises, in a first brew-kettle stage, heating the wort without hops to boil at substantially atmospheric pressure while venting the vaporized constituents thereof, thereby to bring the wort to the desired concentration while eliminating its undesirable vaporizable constituents; and in a second kettle stage introducing hops and heating the brew to boil at atmospheric pressure, and in such second stage restraining the vaporized constituents from venting by cooling and condensing them; and for a temporary preliminary period of such second stage eliminating any undesirable low-boiling-point constituents of the condensate by diverting the early condensate away from the brew and toward a discharge place; and subsequently throughout such second stage reflowing the further condensate including the desirable hop oil and accompanying aromatic volatiles back into the boiling brew.

6. The brewing process of claim 5, wherein the wort contains dextrine and wherein the said subsequent period of boiling, vaporizing, cooling, condensing and reflowing causes gradual emulsifying of the desirable hop oil in the brew by the action of the dextrine of the wort, and is continued until the hop oil is emulsified and stabilized in the brew.

7. The brewing process of claim 5, wherein in the second stage such cooling and condensing of vaporized constituents are performed in a reflux passage; and the elimination of low-boiling-point constituents is performed by diverting the condensate thereof from such reflux passage to the discharge place during such preliminary period.

BERTHOLD STEIN.